Nov. 19, 1946.　　　A. F. MORRIS　　　2,411,454
WEED CUTTER ATTACHMENT FOR DRILL CULTIVATORS
Filed March 3, 1945　　　2 Sheets-Sheet 1
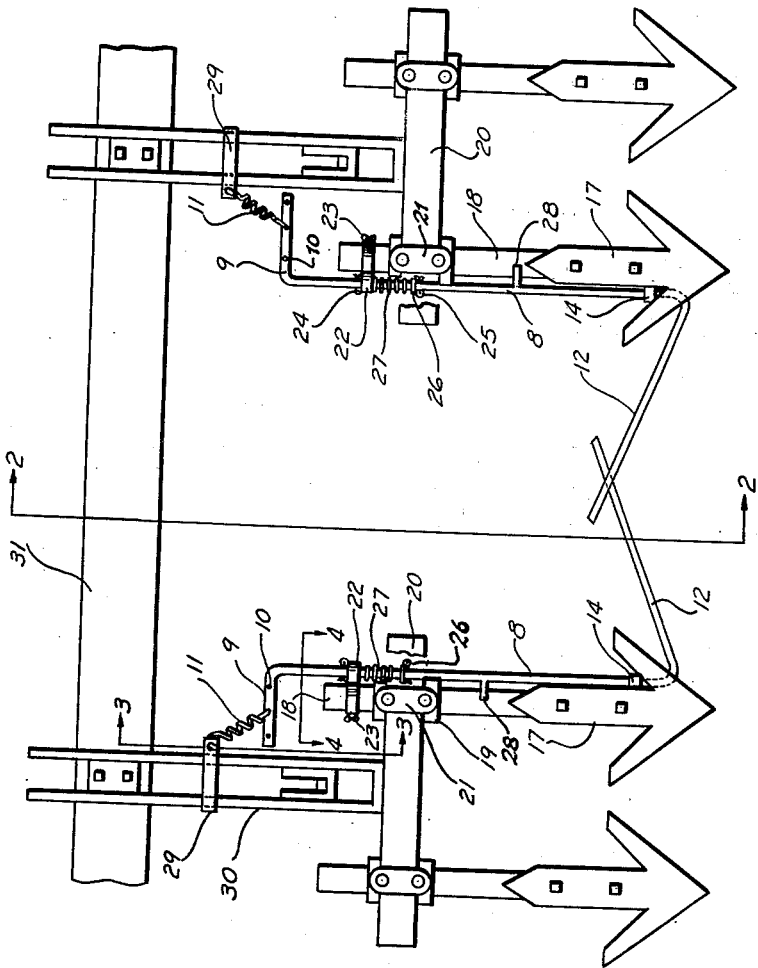
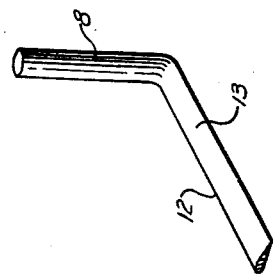
Inventor
ANDERSON F. MORRIS
By *Clarence A. O'Brien and Harvey B. Jackson*
Attorneys Nov. 19, 1946.  A. F. MORRIS  2,411,454
WEED CUTTER ATTACHMENT FOR DRILL CULTIVATORS
Filed March 3, 1945  2 Sheets-Sheet 2

Inventor
ANDERSON F. MORRIS

By Clarence A. O'Brien
and Harvey B. Jackson
Attorneys

Patented Nov. 19, 1946

2,411,454

UNITED STATES PATENT OFFICE 2,411,454

WEED CUTTER ATTACHMENT FOR DRILL CULTIVATORS

Anderson F. Morris, Georgetown, Tex., assignor of one-fourth to Douglas W. Morris, Fort Worth, Tex.

Application March 3, 1945, Serial No. 580,848

5 Claims. (Cl. 97—129)

The present invention relates to a novel and improved weed cutter, this in the form of an attachment for so-called drill cultivators and being adapted to any single, two or four-row type of cultivator.

More specifically, the invention has to do with chopper-style weed cutters which are generally used to coacting pairs, there being one at the left and another at the right, and said cutters being designed to remove grass, small weeds and the like from the drill in cotton, when it has taken root in the ground. These types of weed cutters come in especially handy during the period of the customary second hoeing. In fact, experience has shown that these cutters will remove up to 95% vegetation under favorable conditions.

Having in mind simplicity and resultfulness in achieving my aims satisfactorily, I have found, in carrying out the principles of the invention, that these weed cutter attachments, when applied to cultivators, save a tremendous amount of farm labor and are desirable and helpful in ever so many ways.

Briefly and broadly, each attachment is of general L-shaped form, the vertical shaft being provided with a laterally directed terminal at its upper end for spring anchorage purposes, and said vertical shaft being mounted in upper and lower fixtures, the latter attached to a conventional plow stem or shank.

Other features and advantages will become more readily apparent from the following description and the accompanying illustrative drawings.

In the drawings, wherein like numerals are employed to designate like parts throughout the views:

Figure 1 is what may be designated as a fragmentary front elevational view illustrating a conventional drill cultivator and showing the frame structure and pairs of plows with their standard supporting parts, and a pair of coacting weed cutter attachments constructed in accordance with this invention, these mounted in place in readiness for use.

Figure 6 is a perspective view of the lower end portion of the weed cutter per se, this to bring out the blade feature.

Figure 2:
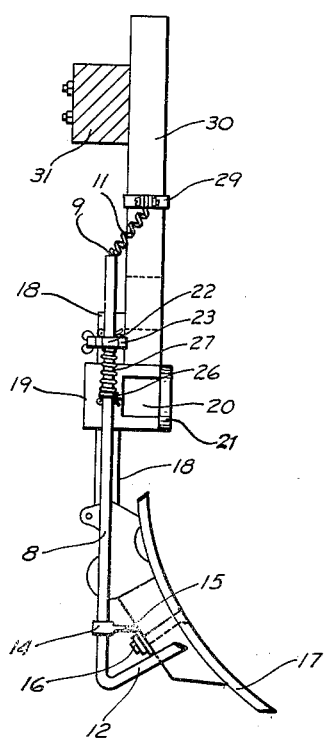
Figure 2 is a section taken on the plane of the line 2—2 of Figure 1, looking in the direction of the arrows.
Figure 5:
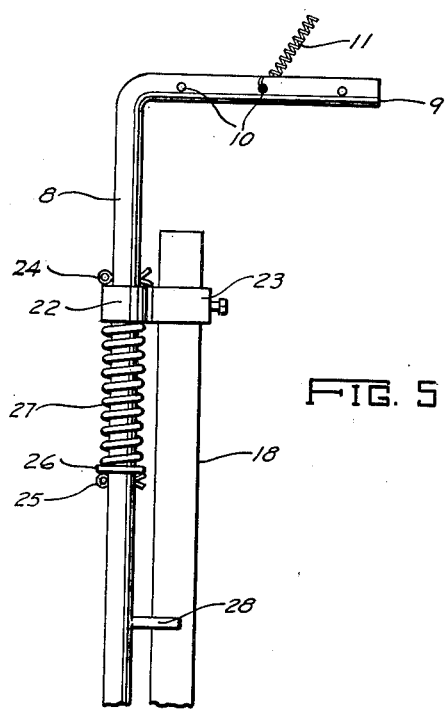
Figure 5 is an enlarged fragmentary view showing the construction of the upper end portion of one of the weed cutter attachments and parts associated directly therewith.
Figure 3:
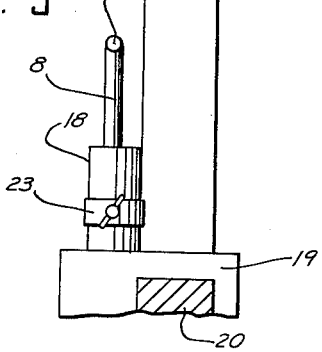
Figure 3 is an enlarged, somewhat exaggerated view taken on the plane of the vertical line 3—3 of Figure 1, with certain of the parts removed for clearness of illustration of the points to be emphasized.
Figure 4:
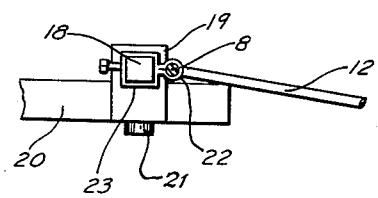
Figure 4 is a horizontal section on the plane of the line 4—4 of Figure 1, looking downwardly, in the direction of the arrows.

As is evident, I am primarily interested in the construction of the weed cutter attachment, and a description of one will suffice for both. Each attachment comprises a one-piece unit characterized by a vertical oscillatory and slidable shaft 8 whose upper end is laterally bent, as at 9, to form a crank, said crank being provided with selectively usable anchor holes 10 for the coiled spring 11. The lower end of the shaft is laterally bent at a somewhat acute angle, as indicated at 12, and is flattened and then sharpened along one edge, as indicated at 13, to provide a weed cutting blade. In practice, I use right hand and left hand cutters as shown in the assemblage depicted in Figure 1. However, the brackets and parts for attaching the cutters are standard and therefore interchangeable. To begin with, I direct attention to Figure 2 showing a guide and assembling eye 14, this carried by a bracket 15, which is secured by a standard or existing bolt 16, the same bolt which serves to fasten the plow sweep 17 to the lower portion of the regular plow shank 18. The plow shank is mounted in the customary block or equivalent device 19 (see Fig. 4), said block being fastened to the hanger bar 20 by the usual cleat arrangement 21. The upper end of the shaft 8 extends through a similar eye 22, this carried by a clamp 23 which embraces and is adjustable on the shank 18. Usually, a set screw is employed to fasten the clamp to the shank. Then, too, I usually employ a cotter key 24 which pierces the shaft and rests against the guide eye 22, as shown in the drawings. Further, as brought out in Figure 5, a lower cotter key 25 serves to hold in place an end thrust washer 26 which in turn accommodates a coiled spring 27, the latter surrounding said shaft and bearing at its upper end against the under side of the guide eye 22. This serves to maintain a downward spring tension on the cutter, specifically, the cutter blade 13. A stop finger is provided and extends laterally out, as at 28, from the shaft 8 and strikes the shank 18 to limit oscillation in one direction. To aforementioned coil spring 11 is adjustably connected to the crank-end 9 and is in turn attached to an anchoring collar 29, the latter adjustable on the frame part 30 carried by the cultivator beam 31.

The clamp 29 can be shifted and adjusted as desired to regulate the tension of the spring 11. This spring in turn exerts the desired pressure against the blade, this according to the type of weeds and plants to be severed by said blade. As stated, the holes 10 permit an independent adjustment between the collar or clamp 29 and crank 9 by way of the spring 11. The closeness of the cutter blade to the ground is regulated primarily by adjustment of the clamp 23 on the plow shank 18. The spring 27 has a downward thrust action and exerts sufficient pressure against the washer and cotter key to maintain the blade in proper contact with the surface, but at the same time providing the desired flexibility and adaptability. As previously stated, the check or stop finger 28 serves to coact with the plow shank 18 and to prevent excessive oscillation or rotation of the shaft 8 in the guide bracket, as is obvious. It follows, therefore, that the attachment is adaptable to single, two or four-row cultivators. Adjustments can be made to operate successfully under any soil conditions. The attachment can also be adjusted according to the plant size. It can be set up or down according to the desired depth of the cut. The points of the blades can be tilted up or down to the desired position by sliding the top bracket up and down on the shanks 18. The coiled spring 27 functions for free flexibility of the blades in cloddy or rocky soil and hence rocks and stumps do not prevent operation of the device.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A cultivator attachment of the class described comprising a lower guide eye, a bracket carrying said eye, said bracket being adapted to be connected to a stock part of a standard plow sweep support, a clamp adapted to be adjustably mounted on the upper end portion of the plow sweep shank, said clamp being provided with a guide eye, a cutter device comprising a vertical shaft mounted for sliding and oscillation in said eyes, said shaft being provided intermediate its ends with a check finger, and at its lower end with a lateral cutting blade, the upper end of said shaft being laterally bent and provided with selectively usable holes, a spring having one end adjustably connected to the shank by way of said holes, said spring being provided with a clamp for adjustable anchorage on a standard part of the cultivator machine.

2. A cultivator attachment of the class described comprising a lower guide eye, a bracket carrying said eye, said bracket being adapted to be connected to a stock part of a standard plow sweep support, a clamp adapted to be adjustably mounted on the upper end portion of the plow sweep shank, said clamp being provided with a guide eye, a cutter device comprising a vertical shaft mounted for sliding and oscillation in said eyes, said shaft being provided at its lower end with a lateral cutting blade, the upper end of said shaft being laterally bent and provided with selectively usable holes, a spring having one end adjustably connected to the shank by way of said holes, said spring being provided with a clamp for adjustment anchorage on a standard part of the cultivator machine, and a coiled spring surrounding said shaft below the second-named guide eye.

3. A cutter attachment for cultivators comprising a weed cutter unit comprising a vertical shaft portion, a lateral blade at the lower end thereof, and a lateral crank at the upper end, a coiled spring connected to said crank, said spring being provided with an anchoring collar, a clamp adapted to be mounted on a plow shank, said clamp being provided with a guide eye, said shaft being turnable and slidable in said guide eye, a coiled spring surrounding the shaft and bearing at one end against the under side of the guide eye, and a thrust collar on said shaft against which the opposite end of said coiled spring rests, and a second guide eye, this provided with an anchoring bracket, the latter being adapted to be connected to an anchoring bolt for a standard type of plow sweep in the manner and for the purposes described.

4. A cultivator attachment of the class described comprising a clamp adapted to be adjustably mounted on the upper end portions of a plough sweep shank, said clamp being provided with a guide eye, a cutter device comprising a vertical shaft mounted for both sliding and oscillating movement in said eye, said shaft being provided at its lower end with a lateral cutting blade, the upper end of said shaft being laterally bent and provided with selectively usable holes, a spring having one end adjustably connected to the shaft by way of said hole, said spring being provided with a clamp, said clamp being adapted for adjustable anchorage on a standard part of the cultivator machine, and a coiled spring surrounding the shaft and located below and engaging said guide eye, said shaft being provided with a stop shoulder spaced below said guide eye and the adjacent end of said spring resting on said shoulder.

5. In a cultivator attachment of the class described, a pair of upper and lower brackets provided with guide eyes, said brackets being adapted to be mounted on predetermined portions of a cultivator machine, a cutter device comprising a vertical shaft mounted for sliding and oscillation in said eyes, said shaft being provided at its lower end with a lateral cutting blade, the upper end of the shaft being laterally bent and provided with selectively usable holes, a spring having one end adjustably connected to said shank by way of said holes, said spring having means for attachment to another part of the cultivator machine, the intermediate portion of said shaft being provided with an outstanding stop finger to limit the oscillating movement in one direction, and a coiled spring surrounding the intermediate portion of said shaft, said spring abutting at its upper end the upper eye, and a washer mounted on said shaft, the lower end of said spring resting against said washer.

ANDERSON F. MORRIS.